(12) United States Patent
Ramm et al.

(10) Patent No.: US 10,890,922 B2
(45) Date of Patent: Jan. 12, 2021

(54) AUTOMATED MULTI-VEHICLE ALIGNMENT STEERING

(71) Applicant: AGJUNCTION LLC, Hiawatha, KS (US)

(72) Inventors: Andreas F. Ramm, Woolloongabba (AU); Eran D. B. Medagoda, Morningside (AU); Timothy J. Sullivan, Kedron (AU); Tri M. Dang, Durack (AU)

(73) Assignee: AGJUNCTION LLC, Scottsdale, AZ (US)

( * ) Notice: Subject to any disclaimer, the term of this patent is extended or adjusted under 35 U.S.C. 154(b) by 351 days.

(21) Appl. No.: 15/348,246

(22) Filed: Nov. 10, 2016

(65) Prior Publication Data

US 2017/0147005 A1     May 25, 2017

Related U.S. Application Data

(60) Provisional application No. 62/257,390, filed on Nov. 19, 2015.

(51) Int. Cl.
*G05D 1/02* (2020.01)
*B60W 30/10* (2006.01)
(Continued)

(52) U.S. Cl.
CPC ....... *G05D 1/0295* (2013.01); *A01D 41/1277* (2013.01); *A01D 43/073* (2013.01); *G05D 2201/0201* (2013.01)

(58) Field of Classification Search
None
See application file for complete search history.

(56) References Cited

U.S. PATENT DOCUMENTS 5,194,851 A    3/1993   Kraning et al.
5,390,125 A    2/1995   Sennott et al.
(Continued)

OTHER PUBLICATIONS

Noh, Kwang-Mo, Self-tuning controller for farm tractor guidance, Iowa State University Retrospective Theses and Dissertations, Paper 9874, (1990).

(Continued)

*Primary Examiner* — Todd Melton
*Assistant Examiner* — Jason R Roberson
(74) *Attorney, Agent, or Firm* — Schwabe Williamson & Wyatt

(57) ABSTRACT

A navigation system aids a driver of a collection vehicle in keeping pace and distance with a lead harvester while collecting grain. The navigation system can be used for any leader-follower vehicle drive formation. A navigation system steers the head vehicle based on a continuously known position and attitude. Navigation data for the lead vehicle is broadcast to a following collection vehicle. A navigation system in the following vehicle processes the lead vehicle navigation data to determine a relative position and attitude. The navigation system in the following vehicle generates steering and speed commands based on the relative position and attitude to automatically drive to a designated target position alongside the lead vehicle. In one example, an artificial oscillation is induced into the target position to more evenly distribute material in the following vehicle.

20 Claims, 7 Drawing Sheets

(51) Int. Cl.
*B60W 10/04* (2006.01)
*A01D 1/00* (2006.01)
*B60W 10/20* (2006.01)
*A01D 43/073* (2006.01)
*A01D 41/127* (2006.01)

(56) References Cited

U.S. PATENT DOCUMENTS

| | | | |
|---|---|---|---|
| 5,663,879 | A | 9/1997 | Trovato et al. |
| 5,923,270 | A | 7/1999 | Sampo et al. |
| 6,052,647 | A | 4/2000 | Parkinson et al. |
| 6,070,673 | A | 6/2000 | Wendte |
| 6,212,453 | B1 | 4/2001 | Kawagoe et al. |
| 6,377,889 | B1 | 4/2002 | Soest |
| 6,445,983 | B1 | 9/2002 | Dickson et al. |
| 6,539,303 | B2 | 3/2003 | McClure et al. |
| 6,789,014 | B1 | 9/2004 | Rekow et al. |
| 6,819,780 | B2 | 11/2004 | Benson et al. |
| 6,865,465 | B2 | 3/2005 | McClure |
| 6,876,920 | B1 | 4/2005 | Mailer |
| 7,142,956 | B2 | 11/2006 | Heiniger et al. |
| 7,277,792 | B2 | 10/2007 | Overschie |
| 7,437,230 | B2 | 10/2008 | McClure |
| 7,460,942 | B2 | 12/2008 | Mailer |
| 8,190,337 | B2 | 5/2012 | McClure |
| 8,589,013 | B2 | 11/2013 | Pieper et al. |
| 8,649,930 | B2 | 2/2014 | Reeve et al. |
| 2002/0072850 | A1 | 6/2002 | McClure et al. |
| 2004/0186644 | A1 | 9/2004 | McClure et al. |
| 2006/0167600 | A1 | 7/2006 | Nelson, Jr. et al. |
| 2009/0043439 | A1* | 2/2009 | Barfoot ............ G05D 1/0297 701/25 |
| 2010/0070145 | A1* | 3/2010 | Foster ............ A01B 79/005 701/50 |
| 2010/0134320 | A1* | 6/2010 | Chevion ............ G08G 1/164 340/932 |
| 2010/0256852 | A1* | 10/2010 | Mudalige ............ G08G 1/22 701/24 |
| 2010/0274452 | A1 | 10/2010 | Ringwald et al. |
| 2011/0022273 | A1* | 1/2011 | Peters ............ G05D 1/0293 701/42 |
| 2011/0251755 | A1* | 10/2011 | Widmann ............ B60R 1/00 701/36 |
| 2014/0100734 | A1* | 4/2014 | Yamashiro ............ G08G 1/22 701/23 |
| 2014/0107867 | A1* | 4/2014 | Yamashiro ............ G08G 1/22 701/2 |
| 2016/0297447 | A1* | 10/2016 | Suzuki ............ B60W 30/18163 |

OTHER PUBLICATIONS

Van Zuydam,. R.P., Centimeter-Precision Guidante of Agricultural Impleet ns in the Open Field by Means of Real Tim Kinematic DGPS, ASA-CSSA-SSSA, pp. 1023-1034 (1999).

* cited by examiner

AXES FOR MULTI-VEHICLE ALIGNMENT
STEERING

GRAIN DISTRIBUTION

AUTOMATED MULTI-VEHICLE ALIGNMENT STEERING

The present application claims priority to U.S. Provisional Patent Application Ser. No. 62/257,390 filed on Nov. 19, 2015, entitled: PARALLEL STEERING FOR AUTOMATED GRAIN COLLECTION which is incorporated by reference in its entirety.

COPYRIGHT NOTICE

A portion of the disclosure of this patent document contains material which is subject to copyright protection. The copyright owner has no objection to the facsimile reproduction by anyone of the patent document or the patent disclosure, as it appears in the United States Patent and Trademark Office patent file or records, but otherwise reserves all copyright rights whatsoever.

TECHNICAL FIELD

One or more implementations relate generally to automated multi-vehicle alignment steering.

BACKGROUND

During harvesting of certain crops, a combine harvester cuts, gathers, and stores grain while moving forward along a field. In many cases, the harvester operates on vast fields that can yield many tons of grain. The storage capacity of the harvester is finite, and well below the quantities of grain collected during a harvest.

To allow the harvester to operate continuously, the collected grain is deposited into a collection vehicle, typically into a trailed grain cart or vehicle with a grain receptacle, via a motorized chute. The grain is deposited from the harvester into the collection vehicle while the harvester is still in motion. Once loaded, the collection vehicle breaks formation and returns to a central station to deposit the grain. The harvester continues to collect grain while the collection vehicle is away. This process is repeated, usually with multiple collection vehicles, until the entire field is processed.

BRIEF DESCRIPTION OF THE DRAWINGS

The included drawings are for illustrative purposes and serve to provide examples of possible structures and operations for the disclosed inventive systems, apparatus, methods and computer-readable storage media. These drawings in no way limit any changes in form and detail that may be made by one skilled in the art without departing from the spirit and scope of the disclosed implementations.

DETAILED DESCRIPTION

A navigation system aids a driver of a collection vehicle in keeping pace and distance with a lead harvester while collecting grain. The navigation system can be used for any leader-follower vehicle system for any driving formation. A navigation system in a lead vehicle may steer the harvester based on a continuously known position and attitude. The position and attitude of the lead vehicle is broadcast to a following collection vehicle. A navigation system in the following vehicle processes the lead vehicle navigation data to determine a relative position and attitude.

The navigation system in the following vehicle generates steering and speed commands based on the relative position and attitude, automatically driving to a designated target point alongside the lead vehicle. For example, the navigation system may automatically drive the following vehicle, such as a grain cart, to a position underneath a grain chute on the lead harvester vehicle.

In the description below, reference is made to a lead vehicle and a following vehicle. It should be understood that the lead vehicle and the following vehicle may include farm vehicles, cars, earth moving vehicles, or any other type of vehicle that travels over the ground. Further, any references to the lead or following vehicle may interchangeably refer to any receptacle either towed or carried by the vehicle that may hold any type of material, such as grain.

Figure 1:
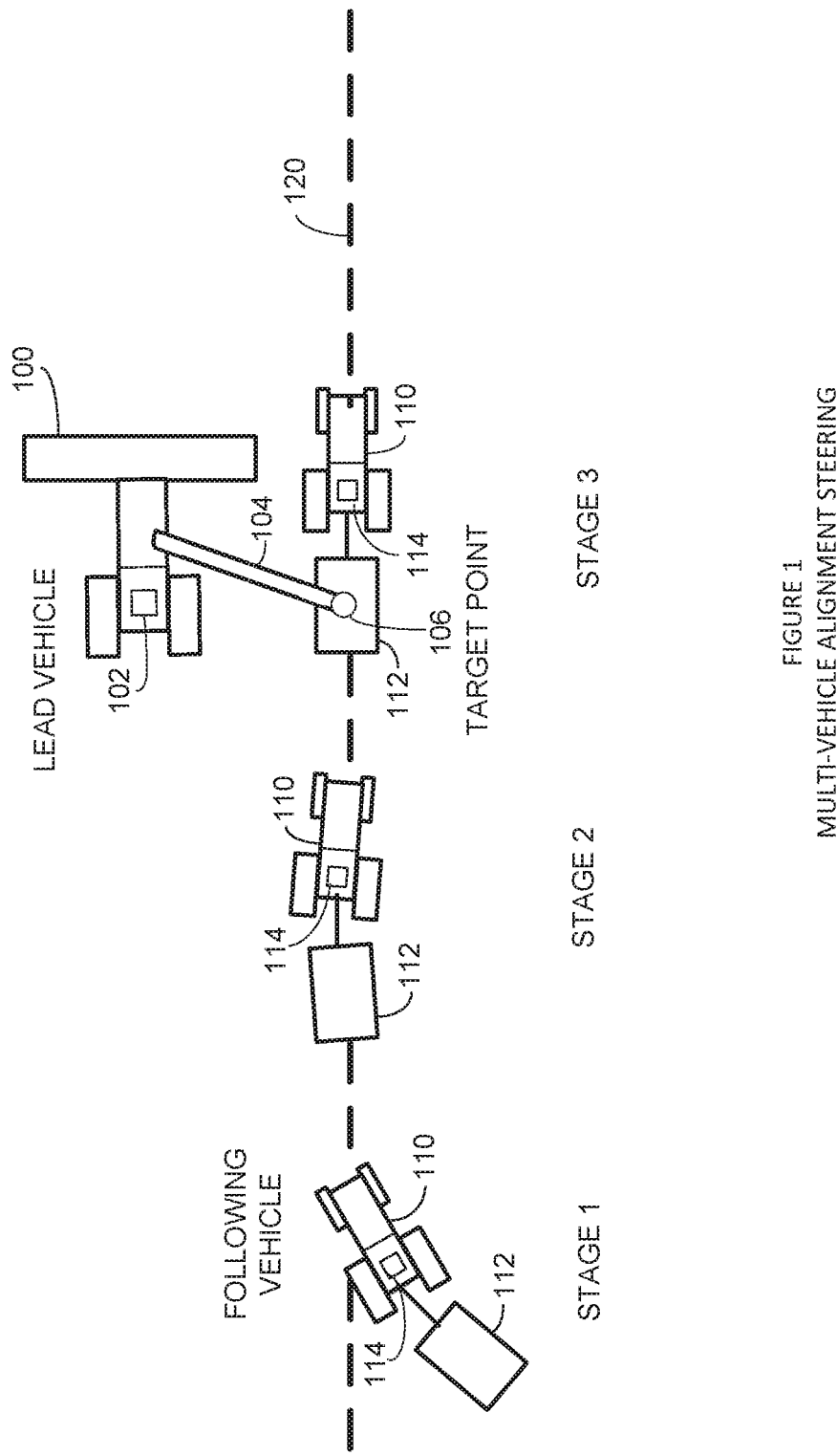
FIG. 1 shows an example automated multi-vehicle alignment steering system.

FIG. 1 shows the automated multi-vehicle alignment steering system. Initially, a following vehicle 110 is some relative position away from a lead vehicle 100 and target point 106. When engaged, a navigation system 114 generates steering and speed commands to drive following vehicle 110 and an attached grain collection receptacle 112 to target point 106. Once grain receptacle 112 is positioned below target point 106, following vehicle 110 slows to match the speed of lead vehicle 100. Following vehicle 110 then maintains a constant relative position so lead vehicle 100 can transfer grain through a chute 104 into grain receptacle 112.

Following vehicle 110 includes a navigation system 114 that receives position data for target point 106 from a navigation system 102 located on lead vehicle 100. Navigation system 114 calculates a longitudinal and lateral distance of following vehicle 110 from target point 106. Navigation system 114 then automatically steers following vehicle 110 until a relative position error to target point 106 is zero while at the same time aligning following vehicle 110 on a parallel path 120 with lead vehicle 100.

For example, during stage 1 following vehicle 110 may be idling and spaced from lead vehicle 100 and target point 106. Navigation system 102 on lead vehicle 100 may send a signal to navigation system 114 to initiate parallel alignment steering and also send location data for target point 106. Navigation system 114 may calculate a path 120 parallel with the heading of lead vehicle 100 that intersects target point 106. Navigation system 114 may calculate a lateral distance of following vehicle 110 from parallel path 120 and a longitudinal distance of following vehicle 110 from parallel path 120 to target point 106. Navigation system 114 then starts navigating vehicle 110 toward parallel path 120.

At stage 2, navigation system 114 steers vehicle 110 and attached grain collection receptacle 112 onto path 120. Navigation system 114 then may increase the speed of following vehicle 110 to catchup and position receptacle 112 underneath target point 106. After aligning with target point 106 at stage 3, navigation system 114 may slow down following vehicle 110 so receptacle 112 remains aligned underneath the outfeed of chute 104 at target point 106.

In one example, lead vehicle 100 may be a combine that harvests any type of grain or other crop and following vehicle 110 may be a truck that tows grain collection receptacle 112 or includes a bed that serves as grain collection receptacle 112. However, the multi-alignment steering system described below may operate with any type of vehicle that may need to steer in a relative alignment with another vehicle. For example, following vehicle 110 may be another combine harvester that is automatically steered in offset alignment with a combine vehicle 100 to cut a crop in an overlapping offset pattern.

Navigation systems 102 and 114 may communicate via a wireless connection to share state information. The communication signals may be broadcast on a specific channel so lead vehicle 100 and following vehicle 110 have knowledge of each other's state information. The exchanged state information may include positions (latitude and longitude) for lead vehicle 100, following vehicle 110, and target point 106. Navigation system 102 may use the state information primarily for display, allowing the vehicle operator to view on a display screen the position of following vehicle 110. Navigation system 114 may use the state information to formulate speed and steering commands for aligning with target point 106 and to display positions of vehicles 100, 110, and target point 106 on a computer screen.

Figure 2:
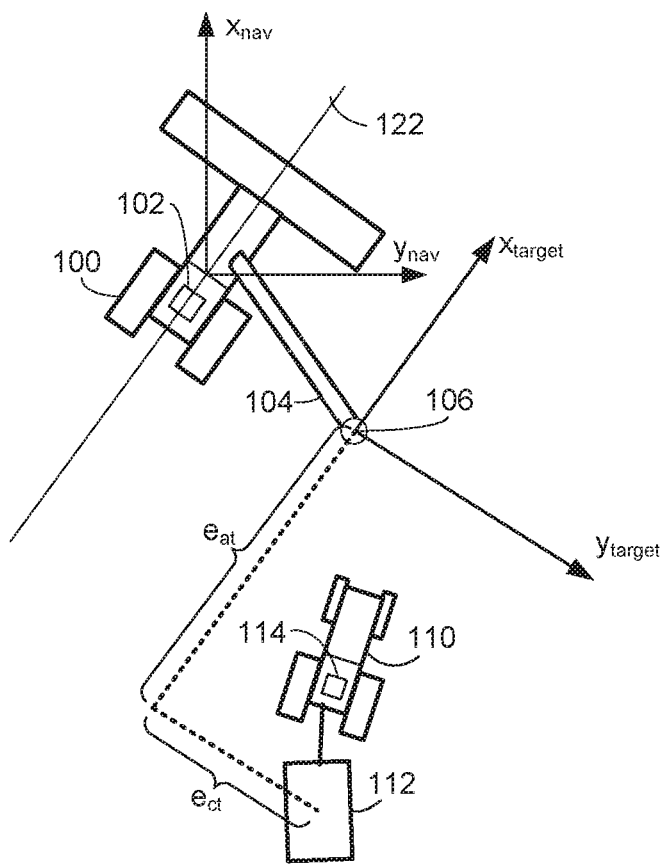
FIG. 2 shows example navigation axes for the multi-vehicle alignment steering system.

FIG. 2 shows axes for multi-vehicle alignment steering. Axes $x_{nav}$ and $y_{nav}$ define a local frame for lead vehicle 100 and are aligned with north and east respectively. Axes $x_{target}$ and $y_{target}$ define an operational frame used by following vehicle 110 and is centered at target point 106. Axis $x_{target}$ is aligned in parallel with a longitudinal body axis or path 122 of lead vehicle 100.

For example, navigation system 102 may steer lead vehicle 100 over a way line 122 programmed into a navigation map. Navigation system 102 may send navigation system 114 the same way line offset by a distance that intersects target 106 along axis $x_{target}$. Navigation system 102 also may know the geometry of grain chute 104 and derive target 106 by offsetting the calculated position of lead vehicle 100 by the length and position of grain chute 104. For if grain chute 104 extends 10 feet to the right of lead vehicle 100, navigation system 102 may calculate the position of target 106 as 10 feet to the right of the calculated position of lead vehicle 100.

Positional errors of following vehicle 110 are measured relative to target 106, with $e_{at}$ defining an along-track error, and $e_{ct}$ defining a cross-track error. Along-track error $e_{at}$ is the longitudinal error between the target 106 and grain receptacle 112 along target frame axis $x_{target}$. Cross-track error $e_{ct}$ is the perpendicular lateral error between target axis $x_{target}$ extending through target point 106 and grain receptacle 112.

Navigation system 114 on following vehicle 110 may try to minimize cross-track error $e_{ct}$ of grain receptacle 112. For example, navigation system 114 may steer follower 110 toward axis $x_{target}$ until the cross-track error reaches zero. One example scheme for performing automatic zero cross-track error steering is described in co-pending patent application, U.S. patent application Ser. No. 15/345,792 entitled: SINGLE-MODE IMPLEMENT STEERING, filed Nov. 8, 2016 which is herein incorporated by reference in its entirety.

In this example, navigation controller 114 generates steering commands for follower 110 based on the following:

$$e_{K_v} = \begin{bmatrix} K_1 & K_2 & K_3 \end{bmatrix} \begin{bmatrix} e_{\psi_v} \\ e_{\psi_t} \\ e_{ct_t} \end{bmatrix} + K_{int} \int e_{ct_t} dt$$

where:
$e_{K_v}$ is the vehicle curvature error of following vehicle 110,
$e_{\psi_v}$ is the heading error of following vehicle 110,
$e_{\psi_t}$ is the trailer heading error of grain receptacle 112 (trailer),
$e_{ct_t}$ is the trailer cross-track error of grain receptacle 112,
$K_1$, $K_2$, and $K_3$ are gain values for navigation system 114, and
$K_{int}$ is an integral term that minimizes the trailer cross-track error.

The gain values are further defined as $$K_1 = \frac{2\zeta\omega_h + \omega_l - \frac{V}{L_3} + \frac{eVK_2}{L_3}}{V},$$

$$K_2 = \frac{\omega_h^2 + 2\zeta\omega_h\omega_l + \frac{c\omega_h^2\omega_l}{V} - \frac{V}{L_2}\left(2\zeta\omega_h + \omega_l - \frac{V}{L_2}\right)}{\frac{V^2}{L_2}\left(1 + \frac{c}{L_2}\right)},$$

$$K_3 = \frac{L_2\omega_h^2\omega_l}{V^3},$$

where:
ωh and ωl define desired high and low frequencies pole locations,
ζ defines a damping factor,
L2 is a length of trailer 112,
c is a hitch length of vehicle 110 behind a control point, and
V is a speed of following vehicle 110.

Speed Control

During fully automated steering, navigation system 114 also may control the speed of following vehicle 110. Navigation system 114 may control the speed in conjunction with the automatic steering control described above. The combined steering and speed control may eliminate a driver from constantly varying steering direction and speed to manually keep grain receptacle 112 underneath the outfeed of chute 104. For the leader-follower scheme described above, navigation system 114 may separate speed control into two phases of target acquisition and grain distribution.

Target Acquisition

During the target acquisition phase, navigation system 114 may increase the speed of vehicle 110 based on the current along track error $e_{at}$ to close the distance between following vehicle 110 and target point 106. For example, when following vehicle 110 is some distance from target point 106, navigation system 114 issues speed commands larger than the speed of leading vehicle 100 to reduce the distance to target point 106.

As the distance reduces, navigation system 114 proportionally decreases the commanded speed allowing following vehicle 110 to gradually approach target 106 without overshooting. If following vehicle 110 does over-shoot target 106, navigation system 114 issues a command to reduce the speed, allowing leading vehicle 100 and target 106 to "catch up" to following vehicle 110.

Mathematically, the speed commands generated by navigation system 114 for following vehicle 110 may be represented as:

$$\Delta V = \left(\frac{2\Delta V_{max}}{\pi}\right)\arctan(e_{at}) \quad (1.0)$$

where $\Delta V$ is the desired following vehicle speed change, $\Delta V_{max}$ is a maximum allowable speed change and $e_{at}$ is the along-track error between the target point 106 and grain receptacle 112.

When $e_{at}$ in Equation 1.0 is large, navigation system 114 changes the speed of following vehicle 110 to $\Delta V$max. As $e_{at}$ approaches zero, navigation system 114 also causes $\Delta V$ to approach zero so following vehicle 110 and grain receptacle 112 maintain a position underneath target point 106 as leading vehicle 100 moves along path 122.

Grain Distribution

Navigation system 114 initiates the grain distribution phase of speed control when grain receptacle 112 successfully acquires target point 106 and is positioned underneath chute 104 ready to receive grain from harvester (leading vehicle) 100. As mentioned above, navigation system 114 may cause following vehicle 110 to maintain the same speed as leading vehicle 100 along target axis $x_{target}$ that is also parallel with leading vehicle path 122.

Lead vehicle 100 may maintain a constant speed along path 122. Navigation system 114 may adjust the speed of following vehicle 110 so grain from grain chute 104 distributes in collection vehicle 112. For example, navigation system 102 or navigation system 114 may induce a simple harmonic oscillation that artificially adjusts a position of target point 106 relative to following vehicle 110. The harmonic modulation causes navigation system 114 to adjust the commanded speed of following vehicle 110 to maintain a position error of zero (hold target position). Accordingly, following vehicle 110 may slow down and speed up relative to the speed of lead vehicle 100 causing grain receptacle 112 to move into different positions underneath grain chute 104.

Mathematically, target position modulation can be expressed as:

$$\Delta e_{at} = \frac{L}{2}\sin(nt) \quad (2.0)$$

where $\Delta e_{at}$ is the change in along-track position of target point 106, L is the length of grain collection receptacle 112, n is a frequency of the along-track error oscillation and t is the time of operation for the grain distribution phase.

Figure 3A:
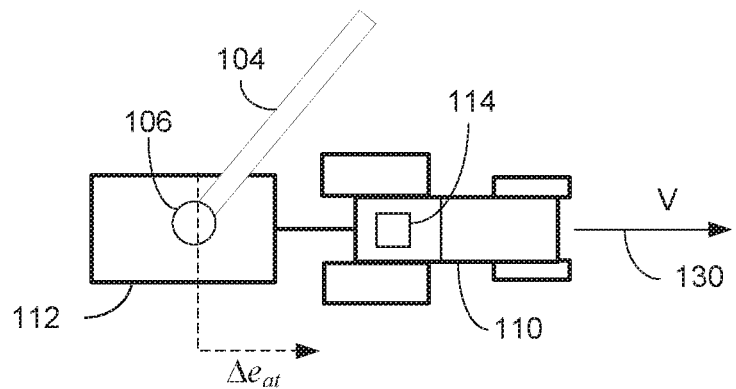
FIGS. 3A-3C show how an artificially induced oscillation in a target point may evenly distribute material into a receptacle.
Figure 3B:
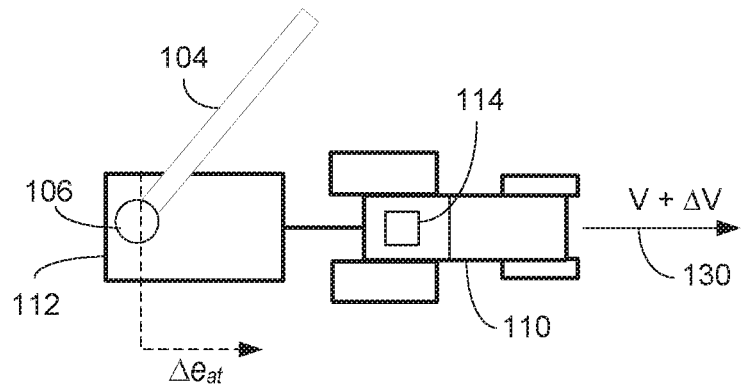
Figure 3C:
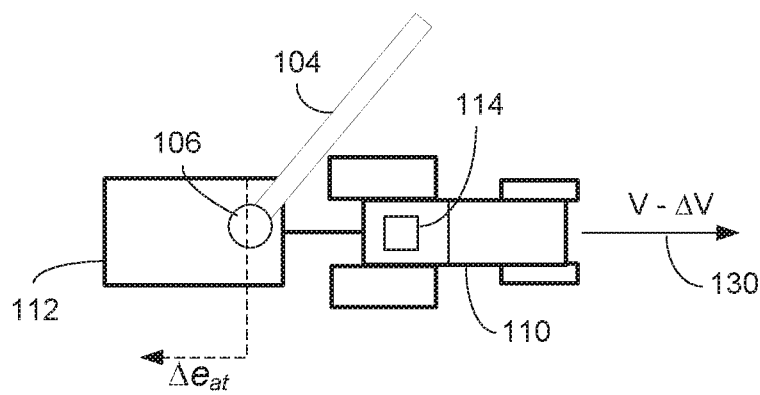

FIGS. 3A-3C illustrate the movement of following vehicle 110 during the grain distribution phase. FIG. 3A shows a center location of grain receptacle 112 aligned beneath the outfeed of grain chute 104 at target point 106. For example, navigation system 114 may steer following vehicle 110 to an along-track heading 130 parallel with a heading of the lead vehicle. Navigation system 114 then increases the speed of following vehicle 110 along parallel heading 130 until grain receptacle 112 is centered underneath target point 106. Navigation system 114 then switches into the grain distribution mode and maintains following vehicle 110 at a same speed V as the lead vehicle.

Once the grain distribution mode is activated, either navigation system 102 in lead vehicle 100 or navigation system 114 in following vehicle 110 creates an artificial along-track target position change as expressed in Equation 2. The artificial target position change causes navigation system 114 to issue a corresponding speed command to a speed controller increasing the speed of following vehicle 110 according to Equation 1 to V+$\Delta$V. FIG. 3B shows target point 106 towards the rear of grain receptacle 112 after navigation system 114 issues the speed increase to following vehicle 110.

As target point 106 nears the rear of grain receptacle 112, navigation system 114 calculates a new speed V-$\Delta$V for following vehicle 110 based on Equations 1.0 and 2.0. For example, Equation 2.0 artificially moves the position of target 106 rearward causing navigation system 114 to slow down to align with the new virtual target position. FIG. 3C shows following vehicle 110 slowed down to realign with the new virtual position of target point 106. The virtual relocation of target 106 rearward causes following vehicle 110 to realign grain chute 104 forward toward the front of grain receptacle 112.

The back-and-forth motion of following vehicle 110 relative to target 106 on path 130 as shown in FIGS. 3A-3C causes grain from chute 104 to more evenly spread inside of receptacle 112 until full.

Figure 4:
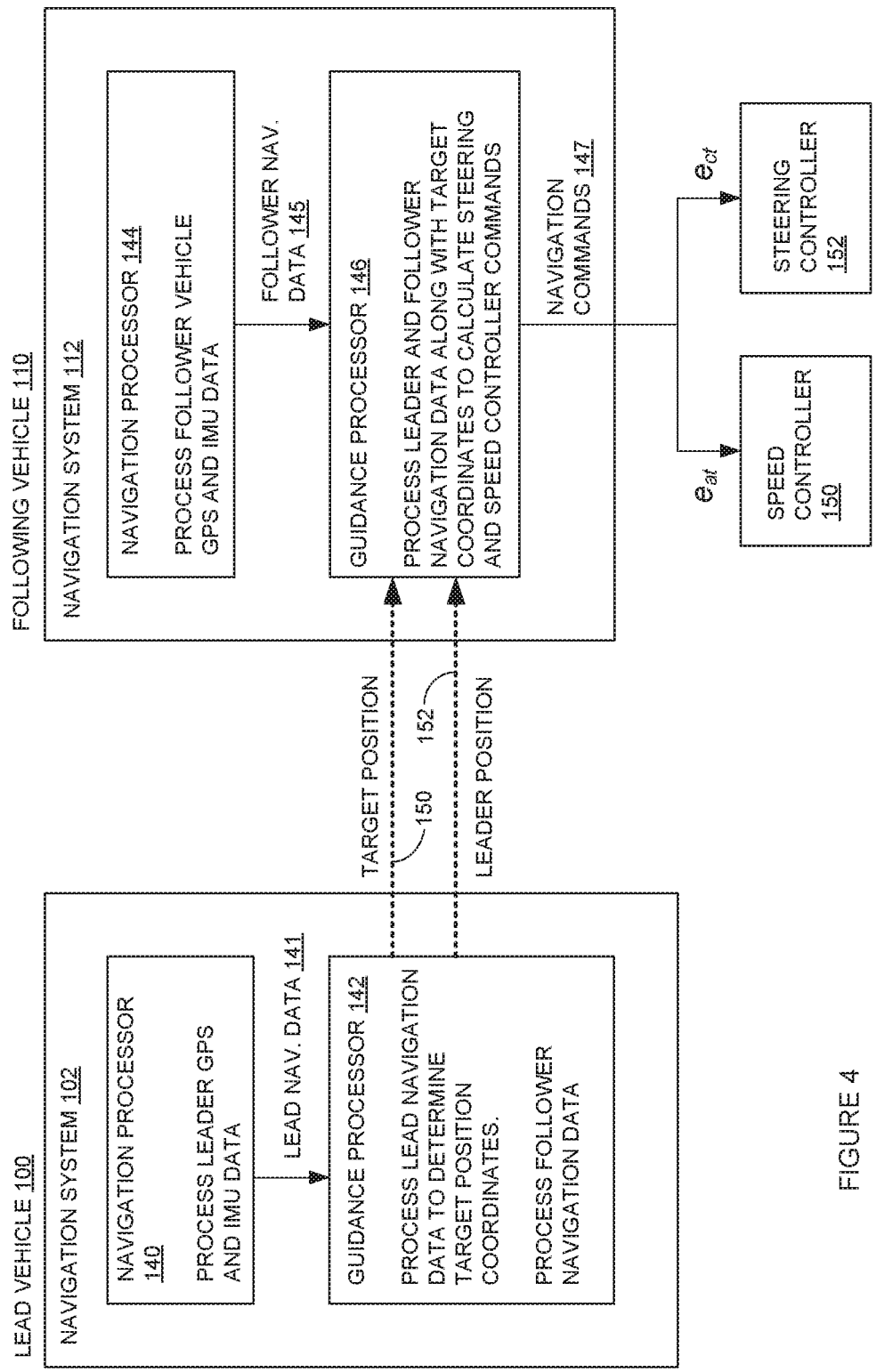
FIG. 4 shows example navigation systems for the multi-vehicle alignment steering system.

FIG. 4 shows a high level diagram of lead and following vehicle navigation systems. Navigation system 102 includes a navigation processor 140 that processes GPS and inertial measurement unit (IMU) data from sensors located on lead vehicle 100. For example, navigation processor 102 may use the GPS and IMU data to determine a position and heading of lead vehicle 100.

The vehicle sensors may include any combination of global positioning system (GPS) receivers and inertial sensors, such as gyroscopes and speed odometers. Vehicle sensors may generate any combination of navigation signals that identify a state of vehicle 100, such as latitudinal and longitudinal positions, heading, speed, steering angle, pitch, roll, yaw, etc.

A guidance processor 142 in navigation system 102 may use navigation data 141 generated by navigation processor 140 to calculate the target point position. For example, guidance processor 142 may calculate a position and heading of a control point on lead vehicle 100 from navigation data 141. Guidance processor 142 then determines an angle and extension distance of the gain chute from the lead vehicle control point.

For example, a motor may move the grain chute into different positions and extensions around lead vehicle 100 and sensors on the grain chute may identify the location of the grain chute outfeed at the different positions and extensions. Guidance processor 142 then calculates the target location based on the angle and distance of the grain chute outfeed from lead vehicle 100 control point position. Navigation system 102 sends the derived target position 150 and the lead vehicle position data 152 to following vehicle 110.

Navigation system 112 in following vehicle 110 includes a navigation processor 144 that generates navigation data 145 based on GPS and IMU data from sensors located on following vehicle 110. For example, navigation system 112 may use the GPS and IMU data to calculate a position and heading of following vehicle 110.

A guidance processor 146 generates navigation commands 147 based on the positions of lead vehicle 100, following vehicle 110, and target point 106. For example, guidance processor 146 generates steering and speed commands 147 based on a cross-track error $e_{ct}$ and along-track error $e_{at}$ of grain collection receptacle 112 from target point position 150 as described above in FIG. 2.

Navigation commands 147 are fed into a speed controller 150 and a steering controller 152 that navigate following vehicle 110 to the target point. For example, steering controller 152 uses a cross-track error $e_{ct}$ provided in steering commands respectively to steer following vehicle 110 onto the path parallel with the lead vehicle path and speed controller 150 uses the along-track error $e_{at}$ from speed commands to adjust the speed of following vehicle 110 to move underneath the target.

Both navigation systems 102 and 112 may include computers with a computer screen that a user accesses to initiate and monitor tracking of following vehicle 110 relative to the target associated with lead vehicle 100. In one example, an operator on lead vehicle 100 may use a touch screen to move the gain chute position. Based on the new position, navigation system 102 generates a new target position 150. Navigation system 112 according generates new navigation commands 147 that automatically steer following vehicle 110 into alignment underneath the new target position.

This may be beneficial for example when the lead vehicle reaches the end of a field and needs to turn around. The lead vehicle operator may move the grain chute and associated target position 150 directly behind lead vehicle 100 so following vehicle 110 follows lead vehicle 100 in a 180 degree turn around onto a next AB line. The lead vehicle operator then moves the grain chute and target position 150 to a lateral position for dispensing grain.

In one example, navigation processor 140 and guidance processor 142 in navigation system 102, and navigation processor 144 and guidance processor 146 in navigation system 112, are functional delineations. For example, first software executed in one or more processing devices located on following vehicle 110 may implement navigation processor 144 and second software executed by the same or a different combination of processing devices may implement guidance processor 146.

Figure 5:
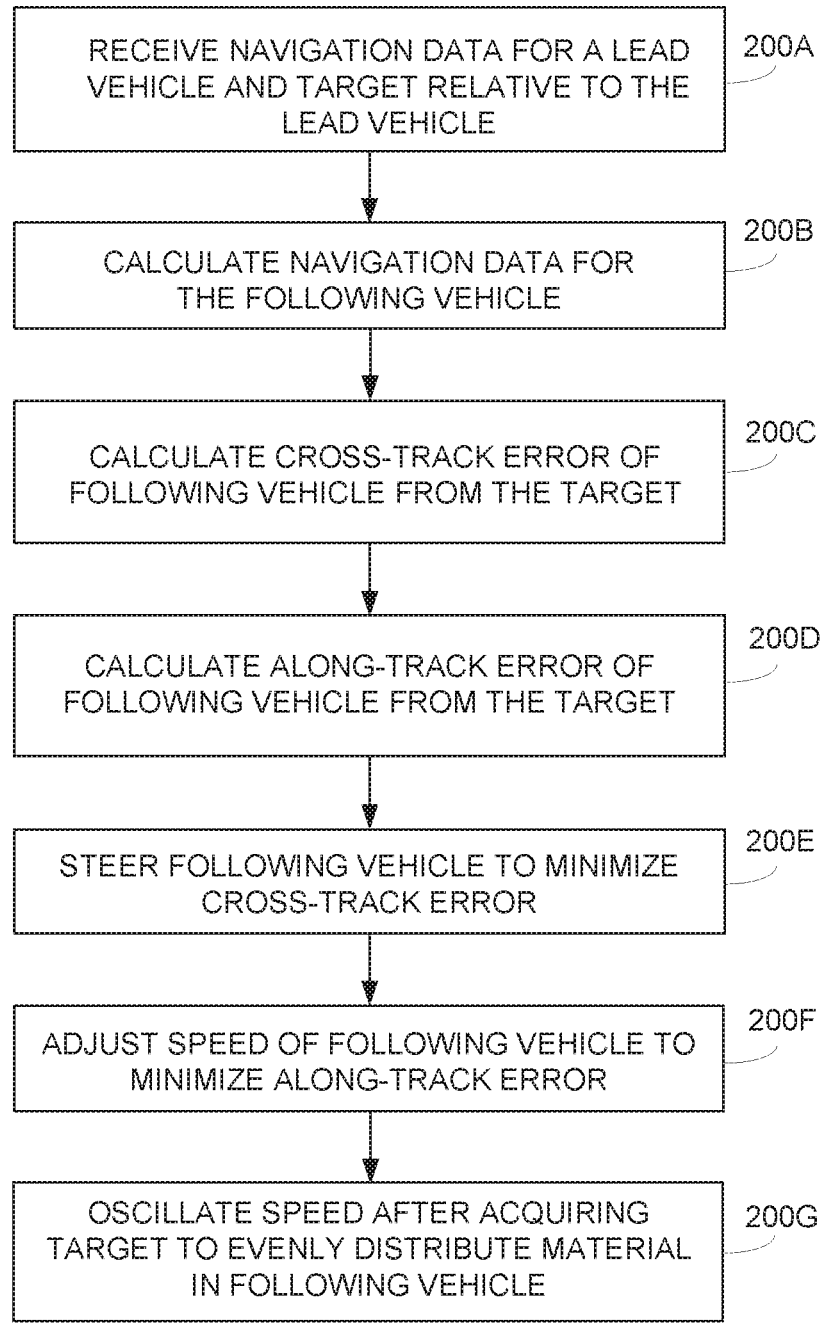
FIG. 5 shows an example process for multi-vehicle alignment steering.

FIG. 5 shows one example multi-vehicle alignment steering process. In operation 200A, the guidance system in the following vehicle receives navigation data for the lead vehicle and target. For example, the lead vehicle may calculate and transmit the lead vehicle and target positions to the following vehicle. Operation 200B calculates the navigation data for the following vehicle. For example, the navigation system may derive a position and heading from GPS and inertial sensors located on the following vehicle.

Operation 200C calculates the cross-track error of the following vehicle. For example, the guidance system may calculate a lateral distance of the following vehicle from a path that extends parallel to the lead vehicle path and intersects the target point. Operation 200D calculates the along-track error of the following vehicle. For example, the guidance system may calculate a distance of the following vehicle along the parallel path to the target point.

Operation 200E steers the following vehicle to align over the parallel path. For example, the navigation system may generate steering commands that minimize the cross-track error to align the following vehicle and any attached gain receptacle with the parallel path. Operation 200F adjusts the speed of the following vehicle to reduce the along-track error. For example, the guidance system may increase or decrease the following vehicle speed proportionally to the along-track error until the following vehicle is aligned with the track point.

After acquisition of the target, the navigation system may move into a grain distribution mode as described above. For example, operation 200G may oscillate the speed of the following vehicle after acquiring the target point to evenly distribute material within the grain collection receptacle. For example, the navigation system may insert an artificial oscillation into the target location causing the following vehicle to move back and forth relative to the target point while the lead vehicle is moving.

Computer, Software, and Hardware Systems

A Global navigation satellite system (GNSS) is broadly defined to include GPS (U.S.) Galileo (European Union, proposed) GLONASS (Russia), Beidou (China) Compass (China, proposed) IRNSS (India, proposed), QZSS (Japan, proposed) and other current and future positioning technology using signal from satellites, with or with augmentation from terrestrial sources.

Inertial navigation systems (INS) may include gyroscopic (gyro) sensors, accelerometers and similar technologies for providing outputs corresponding to the inertial of moving components in all axes, i.e., through six degrees of freedom (positive and negative directions along transverse X, longitudinal Y and vertical Z axes). Yaw, pitch and roll refer to moving component rotation about the Z, X, and Y axes respectively. Said terminology will include the words specifically mentioned, derivative thereof and words of similar meaning.

Figure 6:
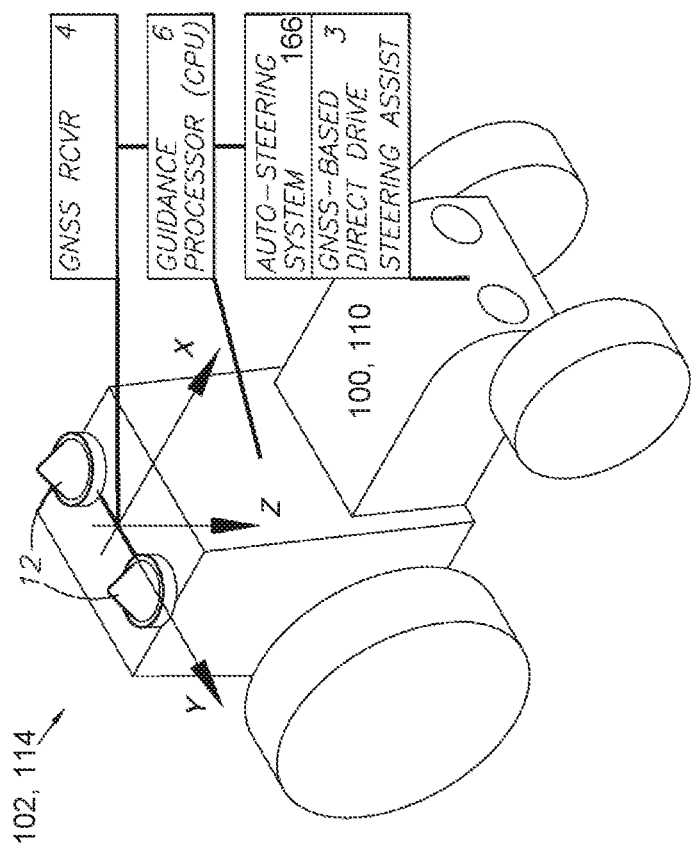
FIG. 6 shows an example guidance system in more detail.

FIG. 6 generally shows guidance systems 102 and 114 used in conjunction with an electrical direct-drive steering assistance mechanism 3. Without limitation on the generality of useful applications of guidance systems 102 and 114, a GNSS receiver 4, and a guidance processor 6 are connected to a GNSS antenna 12 and installed into vehicle 100, such as an agricultural vehicle or tractor. An auto-steering system 166 is electrically connected to guidance processor 6, and is mechanically interfaced with vehicle 100 via steering assistance mechanism 3.

Figure 7:
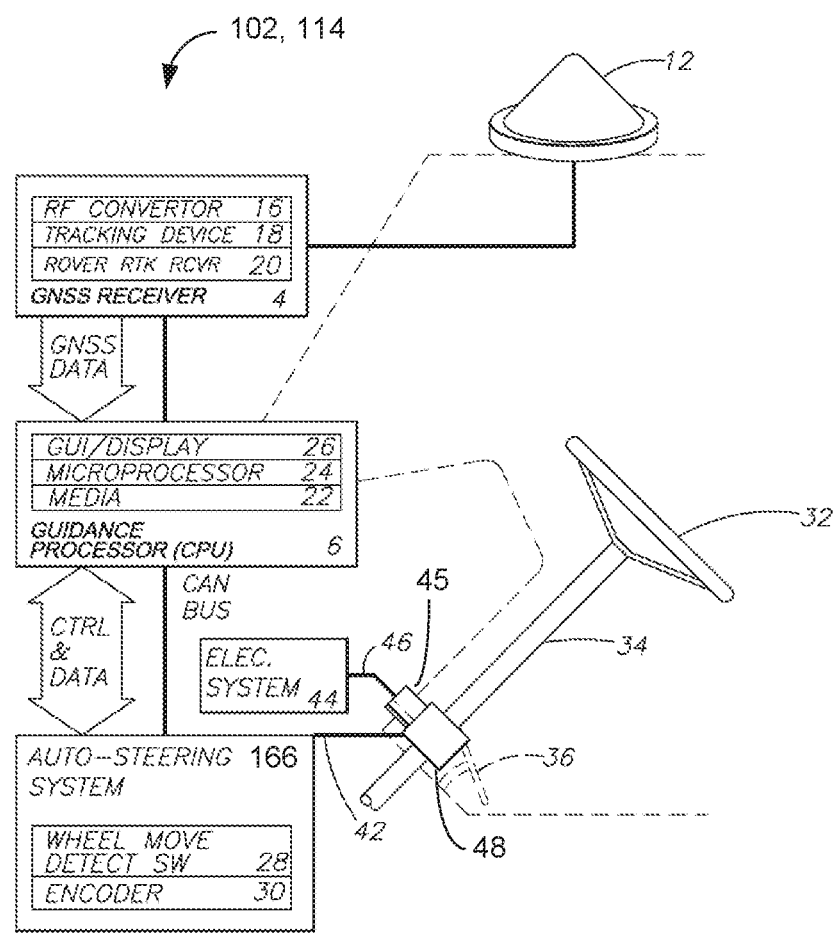
FIG. 7 shows the guidance system of FIG. 6 controlling an auto-steering system.

FIG. 7 shows additional detail of guidance systems 102 or 114. The GNSS receiver 4 is further comprised of an RF convertor (i.e., downconvertor) 16, a tracking device 18, and a rover RTK receiver element 20. The receiver electrically communicates with, and provides GNSS positioning data to, guidance processor 6. Guidance processor 6 includes a graphical user interface (GUI) 26, a microprocessor 24, and a media element 22, such as a memory storage drive. Guidance processor 6 electrically communicates with, and provides control data to auto-steering system 166. Auto-steering system 166 includes a wheel movement detection switch 28 and an encoder 30 for interpreting guidance and steering commands from CPU 6.

Auto-steering system 166 may interface mechanically with the vehicle's steering column 34, which is mechanically attached to steering wheel 32. A control line 42 may transmit guidance data from the CPU 6 to the auto-steering system 166. An electrical subsystem 44, which powers the electrical needs of vehicle 100 or 110, may interface directly with auto-steering system 166 through a power cable 46. The auto-steering subsystem 166 can be mounted to steering column 34 near the floor of the vehicle, and in proximity to the vehicle's control pedals 36. Alternatively, auto-steering system 166 can be mounted at other locations along steering column 34.

The auto-steering system 166 physically drives and steers vehicle 100 or 110 by actively turning the steering wheel 32 via steering column 34. A motor 45 powered by vehicle electrical subsystem 44 may power a worm drive which powers a worm gear 48 affixed to auto-steering system 166.

These components are preferably enclosed in an enclosure. In other embodiments, auto-steering system 166 is integrated directly into the vehicle drive control system independently of steering column 34.

Some of the operations described above may be implemented in software and other operations may be implemented in hardware. One or more of the operations, processes, or methods described herein may be performed by an apparatus, device, or system similar to those as described herein and with reference to the illustrated figures.

"Computer-readable storage medium" (or alternatively, "machine-readable storage medium") used in guidance system 120 may include any type of memory, as well as new technologies that may arise in the future, as long as they may be capable of storing digital information in the nature of a computer program or other data, at least temporarily, in such a manner that the stored information may be "read" by an appropriate processing device. The term "computer-readable" may not be limited to the historical usage of "computer" to imply a complete mainframe, mini-computer, desktop, wireless device, or even a laptop computer. Rather, "computer-readable" may comprise storage medium that may be readable by a processor, processing device, or any computing system. Such media may be any available media that may be locally and/or remotely accessible by a computer or processor, and may include volatile and non-volatile media, and removable and non-removable media.

Examples of systems, apparatus, computer-readable storage media, and methods are provided solely to add context and aid in the understanding of the disclosed implementations. It will thus be apparent to one skilled in the art that the disclosed implementations may be practiced without some or all of the specific details provided. In other instances, certain process or methods also referred to herein as "blocks," have not been described in detail in order to avoid unnecessarily obscuring the disclosed implementations. Other implementations and applications also are possible, and as such, the following examples should not be taken as definitive or limiting either in scope or setting.

References have been made to accompanying drawings, which form a part of the description and in which are shown, by way of illustration, specific implementations. Although these disclosed implementations are described in sufficient detail to enable one skilled in the art to practice the implementations, it is to be understood that these examples are not limiting, such that other implementations may be used and changes may be made to the disclosed implementations without departing from their spirit and scope. For example, the blocks of the methods shown and described are not necessarily performed in the order indicated in some other implementations. Additionally, in other implementations, the disclosed methods may include more or fewer blocks than are described. As another example, some blocks described herein as separate blocks may be combined in some other implementations. Conversely, what may be described herein as a single block may be implemented in multiple blocks in some other implementations. Additionally, the conjunction "or" is intended herein in the inclusive sense where appropriate unless otherwise indicated; that is, the phrase "A, B or C" is intended to include the possibilities of "A," "B," "C," "A and B," "B and C," "A and C" and "A, B and C."

Having described and illustrated the principles of a preferred embodiment, it should be apparent that the embodiments may be modified in arrangement and detail without departing from such principles. Claim is made to all modifications and variation coming within the spirit and scope of the following claims.

What is claimed is:

1. A guidance system, comprising:
a hardware processor to:
calculate a path based on a heading of a lead vehicle as the lead vehicle travels along a way line, wherein the calculated path is parallel with a leading vehicle path;
calculate a lateral distance between a following vehicle and the calculated path, wherein the calculated lateral distance comprises cross-track error;
calculate a longitudinal distance between the following vehicle and a target point along the calculated path, wherein the calculated longitudinal distance comprises along-track error;
generate a first set of navigation commands for the following vehicle to minimize the cross-track error during a first time period and align the following vehicle with the calculated path, and
generate a second set of navigation commands to vary a speed of the following vehicle relative to the lead vehicle to minimize the along-track error during a second time period that is after the first time period.

2. The guidance system of claim 1, wherein the second set of navigation commands is further to vary a speed of the following vehicle proportionally to a current distance between the target point and a point associated with the following vehicle when the following vehicle is aligned with the calculated path.

3. The guidance system of claim 1, the hardware processor further to:
receive a new target point associated with the lead vehicle; and
generate at least one additional navigation command, wherein the at least one additional navigation command is configured to locate a receptacle of the following vehicle under the new target point.

4. The guidance system of claim 1, the hardware processor further to generate a third set of navigation commands to induce harmonic oscillation in the target point that cycles different locations of a receptacle of the following vehicle underneath the target point.

5. The guidance system of claim 1, the hardware processor further to receive position information for the target point via wireless signals transmitted by the leading vehicle.

6. The guidance system of claim 1, wherein the lead vehicle is a combine harvester and the target point is located at an outfeed of a grain chute attached to the combine harvester.

7. The guidance system of claim 6, wherein the following vehicle includes a grain collection receptacle, and wherein the target point is located underneath the outfeed.

8. The guidance system of claim 1, the hardware processor further to:
display a location of the lead vehicle, a location of the following vehicle, and a location of the target point on a display screen;
detect a user selection moving the target point to a new location on the display screen;
calculate a new target point for the new location on the display screen; and
generate at least one additional navigation command, wherein the at least one additional navigation command is configured to locate a receptacle of the following vehicle under the new target point.

9. The guidance system of claim 1, the hardware processor further to:
calculate a location of a control point on the lead vehicle; and
calculate the target point based on a distance and position of a receptacle of the following vehicle relative to the control point on the lead vehicle.

10. The guidance system of claim 1, the hardware processor further to wirelessly transmit the first and second sets of navigation commands to the following vehicle.

11. A method, comprising:
calculating a path based on a heading of a lead vehicle as the lead vehicle travels along a way line, wherein the calculated path is parallel with a leading vehicle path;
calculating a lateral distance between a following vehicle and the calculated path, wherein the calculated lateral distance comprises cross-track error;
calculating a longitudinal distance between the following vehicle and a target point along the calculated path, wherein the calculated longitudinal distance comprises along-track error;
generating a first set of navigation commands for the following vehicle to minimize the cross-track error during a first time period and align the following vehicle with the calculated path, and
generating a second set of navigation commands to vary a speed of the following vehicle relative to the lead vehicle to minimize the along-track error during a second time period that is after the first time period.

12. The method of claim 11, wherein the second set of navigation commands is further to vary a speed of the following vehicle proportionally to a current distance between the target point and a point associated with the following vehicle when the following vehicle is aligned with the calculated path.

13. The method of claim 11, further comprising:
receiving a new target point associated with the lead vehicle; and
generating at least one additional navigation command, wherein the at least one additional navigation command is configured to locate a receptacle of the following vehicle under the new target point.

14. The method of claim 11, further comprising generating a third set of navigation commands to induce harmonic oscillation in the target point that cycles different locations of a receptacle of the following vehicle underneath the target point.

15. The method of claim 11, further comprising receiving position information for the target point via wireless signals transmitted by the leading vehicle.

16. The method of claim 11, wherein the lead vehicle is a combine harvester and the target point is located at an outfeed of a grain chute attached to the combine harvester.

17. The method of claim 16, wherein the following vehicle includes a grain collection receptacle, and wherein the target point is located underneath the outfeed.

18. The method of claim 11, further comprising:
displaying a location of the lead vehicle, a location of the following vehicle, and a location of the target point on a display screen;
detecting a user selection moving the target point to a new location on the display screen;
calculating a new target point for the new location on the display screen; and
generating at least one additional navigation command, wherein the at least one additional navigation command is configured to locate a receptacle of the following vehicle under the new target point.

19. The method of claim 11, further comprising:
calculating a location of a control point on the lead vehicle; and
calculating the target point based on a distance and position of a receptacle of the following vehicle relative to the control point on the lead vehicle.

20. The guidance system of claim 11, further comprising wirelessly transmitting the first and second sets of navigation commands to the following vehicle.

* * * * *